Patented Dec. 9, 1941

2,265,218

UNITED STATES PATENT OFFICE 2,265,218

STABILIZING OF CELLULOSE ESTERS HAVING A HIGH PROPIONYL OR BUTYRYL CONTENT

Herbert G. Stone, Kingsport, Tenn., assignor to Eastman Kodak Company, Rochester, N. Y., a corporation of New Jersey No Drawing. Application December 29, 1939, Serial No. 311,601

7 Claims. (Cl. 260—230)

This invention relates to the stabilizing of lower fatty acid esters of cellulose containing at least 25% of propionyl and butyryl by (1) thoroughly washing the ester and (2) boiling in water the pH of which is maintained between 7.2 and 8.5 by means of water-soluble, alkaline alkali-metal and magnesium salts throughout the boiling operation.

Cellulose acetate and mixed esters of cellulose containing a large proportion of acetyl have been stabilized in various ways without much difficulty. Some of the better known methods of stabilizing cellulose acetates are, (1) hydrolysis with a high proportion of water and a low proportion of catalyst, (2) boiling of freshly precipitated cellulose acetate containing a little acetic acid with water containing on the order of .01% sulfuric acid (3) boiling with distilled or slightly calciferous water after removing the acetic acid from the acetate (4) treatment of cellulose acetate in aqueous suspension with stabilizing salts (5) neutralizing catalyst in the cellulose acetate reaction mixture and ageing before precipitating. None of the known methods of stabilizing cellulose esters containing a substantial proportion of acetyl are suitable for satisfactorily stabilizing lower fatty acid esters of cellulose containing more than 25% of propionyl and butyryl.

The stabilizing of high butyryl cellulose esters featuring passing the reaction mixture through the point of killing the anhydride a plurality of times together with other steps has been suggested but although this method has proven to be effective, it involves a somewhat complex procedure.

An object of my invention is to provide a method of stabilizing high propionyl and butyryl cellulose esters which is so effective that they will show practically no change in color when heated in the dry state for 8 hours at 160° C. Another object of my invention is to provide a method for stabilizing high propionyl and butyryl esters of cellulose which is simple and yet effective if kept within the defined limits.

I have found that lower fatty acid esters of cellulose containing more than 25% of propionyl and butyryl react differently to attempted stabilizing treatments than cellulose acetate or cellulose esters having a high acetyl content. I have found that as far as stabilizing is concerned there is no analogy between the susceptibility of the high propionyl and butyryl esters of cellulose and the cellulose esters having a considerable proportion of acetyl probably because with the former esters; (1) it is difficult to get the precipitate in a most desirable form, (2) the esters resist water penetration, (3) the esters exhibit a greater tenacity for salts and (4) a greater resistance to the removal of combined mineral acids than do cellulose acetates.

I know of no stabilizing method referred to in the prior art as suitable for stabilizing lower fatty acid esters of cellulose which when applied to high propionyl and butyryl esters of cellulose will result in a product of permanent stability as evidenced by resistance to heating for 8 hours at 160° C.

I have found that a high propionyl and butyryl cellulose ester can be satisfactorily stabilized by (1) washing the freshly precipitated ester so free of acidity with water that the final wash water has a pH of 6.5–7.0 and (2) boiling the ester in water the pH of which is kept between 7.2 and 8.5 by means of water-soluble alkaline alkali-metal or magnesium salts. In practice distilled water is employed and therefore the boiling liquid is free of alkaline materials which do not come under the classification given. The only foreign material which may be present is that removed from the cellulose ester during the boiling particularly sulfur containing compounds.

The boiling operation may reduce the pH of the boiling liquid. Therefore to keep the pH from dropping below 7.2 in such case, the prescribed alkaline material may, and usually must, be added from time to time in an amount only sufficient to maintain the pH between 7.2 and 8.5.

The pH limits given should not be either exceeded or much allowed to go below 7.2. If the pH is too high heterogenous hydrolysis of the ester may occur or possibly even alkaline decomposition of the ester. The pH should preferably not be allow to drop below the lower limit due to the lack of effectiveness of the boiling at a pH substantially below 7.2 which would thus consume more time than necessary. I have found that it is only at a pH between 7.2 and 8.5 that the desired results are obtained by my stabilizing method.

Obviously allowing the pH to drop below 7.2 (unless the drop is considerable) has no deleterious action on the ester and therefore is not objectionable although time is saved by maintaining between the limits specified throughout the boiling.

My stabilizing method is adapted to lower fatty acid esters of cellulose containing at least 25% propionyl and butyryl. These esters may be substantially fully esterified or they may have some free hydroxyl groups. My invention is particularly directed to the stabilization of cellulose esters having a high propionyl and butyryl content and not more than 2 free hydroxyl groups per 24 carbon atoms in the cellulose. As examples of esters which are adapted for stabilizing by my method are cellulose acetate butyrates having a butyryl content of 35-40%, corresponding cellulose acetate propionates, cellulose butyrates which are substantially fully esterified such as having a butyryl content of 55% or more, the remainder being acetyl, propionyl or free hydroxyls and corresponding cellulose propionates.

My invention is carried out by washing the freshly precipitated ester free of acidity so that the pH of the last wash bath is between 6.5 and 7.0. If the ester is not washed directly after precipitation some hydrolysis may occur. Although this may not be objectionable in some cases, it is preferred that the washing occur very soon after the precipitation occurs. It is also preferred that the washing be of the counter current type, that is the cellulose ester is subjected to a series of aqueous baths of which the concentration of lower fatty acid therein progressively decreases as the cellulose ester is further processed until at the end it is treated with pure water. In the preferred procedure the boiling or stabilizing treatment is carried out right after the counter-current washing providing the pH of the last wash water is between 6.5 and 7 after washing the ester.

The boiling operation is preferably carried out by first suspending the ester in distilled water, adjusting the pH of the water to 7.2-8.5 using an alkaline salt of the type specified such as sodium bicarbonate and then boiling until the desired stabilization has been effected. Throughout the boiling operation the pH is maintained between 7.2 and 8.5 by adding small amounts of sodium bicarbonate (or equivalent alkaline salt) as required. To determine whether or not satisfactory stabilization has occurred a sample of the ester is taken, washed several times with water, dried and heated, such as in a tube, for 8 hours at 160° C. If the ester shows practically no color change it possesses satisfactory stability. A similar ester of unsatisfactory stability melts rapidly by this test and at the end of 8 hours is a black or dark brown charred mass. The time of boiling to impart good stability to a cellulose ester having a high propionyl and butyryl content is usually between 5 and 24 hours depending on the particular ester. However a boiling range of 1-100 hours is found useful. For example an ester which is nearly of satisfactory stability may need treatment for only 1 hour to give a satisfactory product. On the other hand an ester of poor stability and physical condition may require a long treatment such as approximately 100 hours to reach a stability which is desired. The time of treatment is governed by the time necessary to give an ester which exhibits no color change in a tube for 8 hours at 160° C. Esters of the type described are benefitted as to stability by treating for any time ranging from 1-100 hours. If desired the boiling may be either at a reduced or an elevated pressure instead of at atmospheric pressure or the stabilization may be effected at an elevated temperature, near to but short of the boiling point. When a temperature below, even though near to, 100° C. (such as in a range of 80° C. up to 100° C.) is used a longer time of treatment will ordinarily be required to get good stability. Obviously if an elevated pressure is used the boiling temperature will be above 100° C. being governed by the pressure which is present or to be used. For example if a pressure of 60 lbs. is used the boiling temperature will necessarily be around 145° C.

The alkaline water-soluble salts which I have found to be effective in the boiling step to maintain the pH above 7.2 are the carbonates of magnesium or the alkali metals such as sodium or potassium carbonate, sodium or potassium bicarbonate ($NaHCO_3$) and magnesium carbonate. Other water-soluble salts of the alkali metals or magnesium with weak acids such as sodium borate, trisodium phosphate, magnesium benzoate or sodium silicate or the corresponding salts of the other alkali metals may be employed. It is only necessary that the salts be sufficiently water-soluble to impart the desired pH without coming out of solution under the conditions employed in the stabilizing treatment.

The following examples illustrate the making of propionic or butyric acid esters of cellulose utilizing my invention:

*Example I*

500 lbs. of refined cotton linters were soaked for 4 hrs. at 100-120° F. with a mixture of 500 lbs. of butyric acid and 500 lbs. of acetic acid. The mass was cooled to 60° F. and a mixture of 2,000 lbs. of butyric anhydride and 12½ lbs. of 95% $H_2SO_4$, which mixture had a temperature of 0° C. was added thereto. The esterification was allowed to proceed to a maximum temperature of 80° F. in 6½ hours and was complete in 16 hours. 2,000 lbs. of 75% aqueous acetic acid was added, the temperature was brought to 100° F. and the cellulose ester was hydrolyzed by maintaining at this temperature for 60 hours.

The mass was diluted with 5500 lbs. of acetic acid and 2500 lbs. of 38% mixed acids and the catalyst was neutralized with 13 lbs. of soda ash and the cellulose acetate butyrate (36% butyryl, 13% acetyl) was then precipitated from the reaction mixture by first mixing with aqueous lower fatty acid of 12% strength, obtained from the counter current washing of a previous batch of the same kind, in an amount insufficient to precipitate the ester and then pouring into a large agitated mass of aqueous acetic acid (or mixed lower fatty acids) of 20% strength. At the termination of the precipitation the concentration of the precipitating acid was 38%, figured as acetic acid. The flake precipitate so formed was washed once with very dilute aqueous mixed acid and was then washed with distilled water by percolating the water through the mass until the water coming off contained only .2% of acid figured as acetic acid. The flakes were then washed 20 times with 18 parts of filtered water and then covered with 18 parts of distilled water. An amount of $NaHCO_3$ (400 gms.) to raise the water from a pH of 6.7 to about 8 was added and the mass was subjected to boiling. To prevent the pH from dropping below 7.2, a further amount of $NaHCO_3$ (300 gms.) was added at the end of 13 hours and boiling was continued for 8 hours longer. A sample was extracted from the mass, washed, dried and tested and was found to give no coloration on heating at 160° C. for 8 hours.

The ester was washed 5 times with filtered water, rinsed with distilled water, centrifuged and dried at 180-200° F. The stabilized ester was found to have a softening point of 208° C., a char point of 308° C., and to be resistant to a temperature of 160° C. for 8 hours.

Example II 35 lbs. of refined cotton linters were thoroughly soaked with water. The water was then removed by pressing followed by extraction of the linters with butyric acid.

The linters were then esterified to the tributyrate with a mixture essentially consisting of

| | | |
|---|---|---|
| Butyric acid | lbs | 70 |
| Butyric anhydride | lbs | 140 |
| Sulfuric acid | cc | 216 |

A clean viscous dope having a tetrachlorethane, first-stage viscosity of 15 seconds was obtained.

35 lbs. of aqueous acetic acid (50% strength) was added and hydrolysis was induced by holding at 100° F. for 127 hours. The mass was diluted with 250 lbs. of aqueous acetic acid (75% strength) and was precipitated by adding the dope and distilled water slowly and simultaneously into a vigorously agitated vessel. The strength of the resultant bath was 35%, figured as acetic acid. The cellulose butyrate precipitated in an open flake form.

The precipitate was spray washed with distilled water to .1% acid and was then washed 19 times with filtered water after which it was rinsed once with distilled water and then filled with 20 parts of distilled water which was adjusted to a pH between 7.2 and 8.5, using 30 grams of sodium acid carbonate. The mass was boiled actively for 22½ hours at which time the test of a sample indicated the ester was sufficiently stabilized. During the course of the boiling, additional amounts of 30 grams, 10 grams and 10 grams of sodium acid carbonate were added at 3, 7 and 16 hours, respectively, to maintain the pH between the 7.2–8.5 limits. The material was separated from the water in which it was boiled and was washed five times with filtered water, rinsed with distilled water, centrifuged and dried at around 200° F. The resulting product contained 53.9% combined butyryl and 1.6% of acetyl, had a softening point of 175° C., a char point of 280° C. and was resistant to a 160° C. heat for 8 hours.

Example III

A cellulose acetate propionate was prepared by esterifying 25 lbs. of refined cotton linters with the following mixture:

| | | |
|---|---|---|
| Glacial acetic acid | lbs | 65 |
| Propionic acid (100%) | lbs | 50 |
| Propionic anhydride | lbs | 85 |
| Sulfuric acid | cc | 375 |

A clear dope of 100 seconds first-stage viscosity was obtained. 50 lbs. of aqueous acetic acid (50% strength) was added thereto and the ester was hydrolyzed by subjecting the mass to a temperature of 100° F. until it had a hydroxyl content of .3 per six carbon atoms in the cellulose. The dope was then diluted with 75 lbs. of acetic acid and precipitated with water in a suitably agitated vessel at 40% concentration in a manner similar to that used in the preceding example. The resulting precipitate was separated from the liquid, was sprayed, washed with filtered water down to a value of .1% acid, was washed 20 times with filtered water, rinsed with distilled water and then boiled for 18 hours with 20 parts of distilled water containing 25 grams of sodium acid carbonate. The pH at the start of the boil was 7.8. After four hours, the pH was 7.2 at which time 15 grams of sodium acid carbonate was added to bring it back to 8.1. The stabilization was finished without further additions of sodium acid carbonate, the pH at the end being 7.4. The stabilized ester was washed five times with filtered water, rinsed with distilled water and dried at 215° F. The resulting product had a propionyl content of 25% and acetyl content of 20.5%, a char point of 295° F. and was resistant to a temperature of 160° C. for 8 hours.

The esters stabilized in accordance with my invention are characterized by high char points such as at least 280° C. and as a rule 300° C. or more together with a melting point at least 60° C. and generally approximately 100° C. below the char point. Consequently these esters are eminently suited for use in methods of coating surfaces in which melting of the ester occurs such as in the coating processes described and claimed in Malm and Clarke application Serial No. 275,485 and in Malm and Salo application Serial No. 275,484, filed May 24, 1939, or in the coating process described in Malm and Clarke application Serial No. 303,871, filed November 10, 1939, for the undercoat which is melted on to the surface to be coated. Because of their good stability the esters stabilized in accordance with my invention have good permanence and therefore last for a long period of years.

The esters stabilized in accordance with my invention if of the viscosity specified are eminently suited for use in the thermoplastic molding compositions described and claimed in Conklin and Malm application Serial No. 275,483 filed May 24, 1939.

The esters stabilized in accordance with my invention are also useful because of their permanence in the manufacture of sheeting, photographic film base or synthetic yarn. They are also useful for making laminated glass particularly in making the products described and claimed in Malm and Clarke application Serial No. 275,486 and Conklin and Malm application Serial No. 275,482 both filed May 24, 1939.

It is to be understood that in the boiling operation the pH may go below 7.2 providing it does not go over to the acid side. Therefore the pH should not be permitted to go below 6.5. As however the effectiveness is lost at a pH below 7.2 maintenance above this figure results in the saving of time.

The water which is employed for the stabilizing operation is preferably distilled water or at least is free of salts or other materials which will detrimentally affect the ester such as by depositing insoluble material therein or by altering appreciably the viscosity of the ester. The term "resistant" as applied to the ester with reference to heating for 8 hours at 160° C. is to be understood as meaning that there is practically no change in the color of the ester as a result of this treatment, a slight tan color being the maximum effect in any case of that heating on a cellulose ester having a satisfactory stability.

I claim:

1. In the manufacture of lower fatty acid esters of cellulose having a content of at least 25% of saturated fatty acid groups of 3–4 carbon atoms and not more than 2 free hydroxyl groups per 24 cellulose carbon atoms in which a sulfuric acid catalyst is employed in the esterification, which esterification is followed by precipitation of the ester and its separation from the reaction mixture, the steps which comprise washing the ester with substantially neutral water until the spent wash water has a pH of 6.5-7 and subsequently treating the ester with water having a pH of 7.2-8.5 at a temperature of at least 80° C. but not more than 145° C. for a time sufficient to render the ester resistant, when dry, to heating for 8 hours at 160° C., the pH of the water being maintained at 7.2-8.5 during at least the major portion of the treatment the maintaining of the pH of 7.2-8.5 being by means of an alkaline material selected from the alkaline, water-soluble alkali-metal and magnesium salts.

2. In the manufacture of lower fatty acid esters of cellulose having a content of at least 25% of saturated fatty acid groups of 3-4 carbon atoms and not more than 2 free hydroxyl groups per 24 cellulose carbon atoms in which a sulfuric acid catalyst is employed in the esterification, which esterification is followed by precipitation of the ester and its separation from the reaction mixture, the steps which comprise washing the ester with substantially neutral water until the spent wash water has a pH of 6.5-7 and subsequently treating the ester with water having a pH of 7.2-8.5 at a temperature of at least 80° C. but not more than 145° C. for 1-100 hours, the pH of the water being maintained at 7.2-8.5 during at least the major portion of the treatment the maintaining of the pH of 7.2-8.5 being my means of an alkaline material selected from the alkaline, water-soluble alkali-metal and magnesium salts.

3. In the manufacture of lower fatty acid esters of cellulose having a content of at least 25% of saturated fatty acid groups of 3-4 carbon atoms and not more than 2 free hydroxyl groups per 24 cellulose carbon atoms in which a sulfuric acid catalyst is employed in the esterification, which esterification is followed by precipitation of the ester and its separation from the reaction mixture, the steps which comprise washing the ester with substantially neutral water until the spent wash water has a pH of 6.5-7 and subsequently treating the ester with water having a pH of 7.2-8.5 at a temperature of at least 80° C. but not more than 145° C. for 5-24 hours, the pH of the water being maintained at 7.2-8.5 during at least the major portion of the treatment the maintaining of the pH of 7.2-8.5 being by means of an alkaline material selected from the alkaline, water-soluble alkali-metal and magnesium salts.

4. In the manufacture of lower fatty acid esters of cellulose having a content of at least 25% of saturated fatty acid groups of 3-4 carbon atoms and not more than 2 free hydroxyl groups per 24 cellulose carbon atoms in which a sulfuric acid catalyst is employed in the esterification, which esterification is followed by precipitation of the ester and its separation from the reaction mixture, the steps which comprise counter-currently washing the ester, finishing the washing with substantially neutral water until the spent wash water has a pH of 6.5-7 and subsequently treating the ester with water having a pH of 7.2-8.5 at a temperature of at least 80° C. but not more than 145° C., the water being maintained at a pH of 7.2-8.5 during the treatment by means of an alkaline material selected from the alkaline, water-soluble alkali-metal and magnesium salts.

5. In the manufacture of lower fatty acid esters of cellulose having a content of at least 25% of saturated fatty acid groups of 3-4 carbon atoms and not more than 2 free hydroxyl group per 24 cellulose carbon atoms in which a sulfuric acid catalyst is employed in the esterification, which esterification is followed by precipitation of the ester and its separation from the reaction mixture, the steps which comprise washing the ester with substantially neutral water until the spent wash water has a pH of 6.5-7 and subsequently treating the ester with water having a pH of 7.2-8.5 at a temperature of at least 80° C. but not more than 145° C., the water being maintained at a pH of 7.2-8.5 during the treatment, the alkalinity of the water being imparted by an alkaline material selected from the alkaline, water-soluble alkali-metal and magnesium salts.

6. In the manufacture of lower fatty acid esters of cellulose having a content of at least 25% of saturated fatty acid groups of 3-4 carbon atoms and not more than 2 free hydroxyl groups per 24 cellulose carbon atoms in which a sulfuric acid catalyst is employed in the esterification, which esterification is followed by precipitation of the ester and its separation from the reaction mixture, the steps which comprise washing the ester with substantially neutral water until a spent wash water is obtained having a pH of 6.5-7 and subsequently treating the ester with boiling water maintained at a pH of 7.2-8.5 during the entire course of treatment, the alkalinity being imparted to the water by an alkaline material selected from the alkaline, water-soluble alkali-metal and magnesium salts.

7. In the manufacture of mixed fatty acid esters of cellulose having a content of 35-40% of saturated fatty acid groups of 3-4 carbon atoms the remainder of the acyl being acetyl and not more than 2 free hydroxyl groups per 24 cellulose carbon atoms in which a sulfuric acid catalyst is employed in the esterification which esterification is followed by precipitation of the ester and its separation from the reaction mixture, the steps which comprise washing the ester with substantially neutral water until the spent wash water has a pH of 6.5-7 and subsequently treating the ester with water having a pH of 7.2-8.5 at a temperature of at least 80° C. but not more than 145° C. for 5-24 hours, the pH of the water being maintained at 7.2-8.5 during at least the major portion of the treatment, the maintaining of the pH of 7.2-8.5 being by means of an alkaline material selected from the alkaline, water-soluble alkali-metal and magnesium salts.

HERBERT G. STONE.